Oct. 2, 1962
C. CHANDLER
3,056,201
POWERED CUTTING TOOLS
Filed Oct. 18, 1960
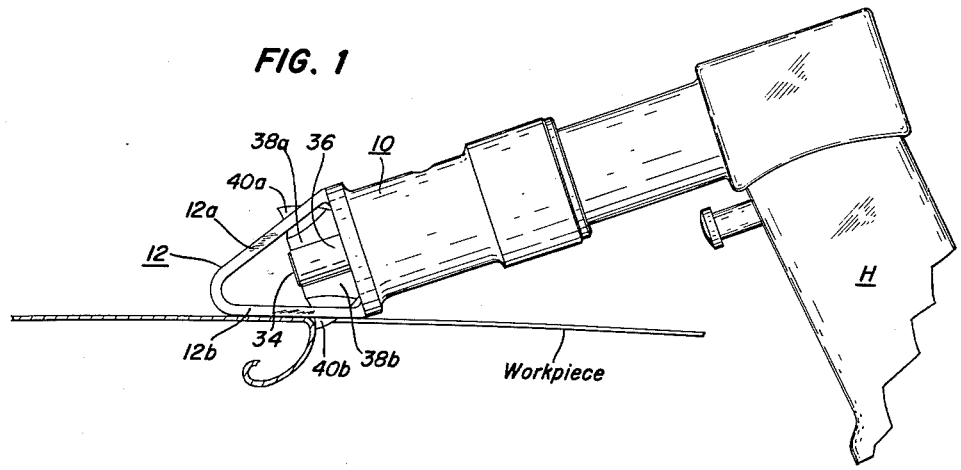
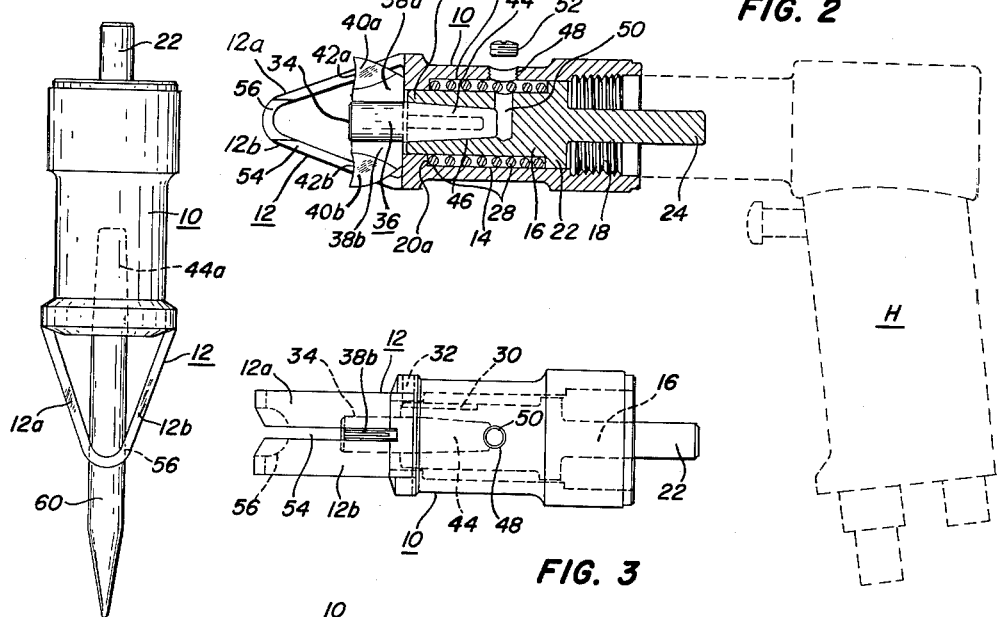
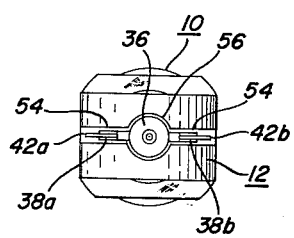
INVENTOR
CLARK CHANDLER
BY
ATTORNEY

United States Patent Office 3,056,201
Patented Oct. 2, 1962

3,056,201
POWERED CUTTING TOOLS
Clark Chandler, 1221 Harrison Ave., Panama City, Fla.
Filed Oct. 18, 1960, Ser. No. 63,361
10 Claims. (Cl. 30—277)

This invention relates to improvements in powered cutting tools, and more particularly to an improved, power-operated cutting tool of the type commonly referred to as a panel cutter or shear which, although designed especially for use in automobile body repair work, may be used in any and all applications requiring straight-and/or curved-line cuts to be simply, quickly and effectively made in metal sheets, panels and the like by means of a hand-type tool, as distinguished from the large fixed type cutting or stamping-out machine.

The present invention, which is the culmination of long experience with panel cutters generally and continuing experience with power-operated panel cutters of the type disclosed and claimed in my prior applications Serial No. 612, filed January 5, 1960, now Patent No. 3,003,237, dated October 10, 1961, and Serial No. 21,663, filed April 12, 1960 (now abandoned) and its continuation-in-part application Serial No. 90,727, filed February 21, 1961, has for its primary object that of providing a power-operated, hand-type cutting tool for use in cutting panels, metal sheets and the like which is characterized by simple and compact design, ease in handling and application to the workpieces, optimum operating effectiveness, high cutting speed, and which is further relatively inexpensive in manufacture and maintenance but which at the same time is thoroughly dependable in operation.

More particularly, it is an object of the present invention to provide an improved chisel-type panel cutter which will work off a conventional power hammer, either air or electric, and which is characterized by a reciprocating double-edged cutting tool and by a double-sided workpiece-engaging shoe, whereby said panel cutter may be operated from either one of two opposite sides.

A further object of the invention is the provision of a powered panel cutter constructed and arranged so as to be capable of cutting from either one of two opposite sides thereof.

Yet another object of the invention is the provision of a reciprocating-blade type of powered panel cutter which incorporates improved means for retaining the cutting tool and further provides for simple mounting and interchange of tools when such becomes necessary or desirable.

Still another object of the invention is the provision of an improved construction and design of cutting tool for use with powered panel cutters.

The above and other objects and features of advantage of the improved panel cutter according to the present invention will be apparent from the following detailed description thereof, taken with the accompanying illustrative drawing wherein:

FIG. 1 is a side elevation of a powered panel cutter according to the invention, which illustrates both its manner of use and of curling the scrap below the workpiece, rather than upwardly therefrom as is customary;

FIG. 2 is a vertical longitudinal section taken through the panel cutter shown in FIG. 1, which illustrates its interior construction and design, as well as the manner of its coupling to a power hammer which is shown in broken lines;

FIG. 3 is a top plan view of the panel cutter illustrated in the prior views, separated from the impact hammer which powers the same;

FIG. 4 is a front-end elevation of the panel cutter as viewed from the left end in FIG. 3; and FIG. 5 is a top plan view showing the capability of the herein panel cutter in mounting other types of cutting tools than as shown in FIGS. 1–4, such as a conventional cold chisel for power operation.

Referring to the drawings in greater detail, the power-operated panel and/or sheet-cutter according to the present invention comprises a tubular barrel or housing member 10 having a workpiece-engaging foot or shoe member 12 (which will be later described in detail) affixed to its relatively forward end and mounting in its bore portion generally designated 14 a reciprocating plunger 16. The other or rearward end of the housing member is preferably externally enlarged and has a similarly enlarged bore portion 18 which is internally threaded as shown, so as to be capable of threadedly receiving the externally threaded barrel of power (usually air) hammer designed H, which is generally shown in full lines in FIG. 1 and in broken lines in FIG. 2. At its forward end the bore 14 of the housing terminates in a smaller-diameter bore portion 20, the differential diametering of the bore portions 14 and 20 resulting in the formation of an axially facing internal shoulder 20a between said bore portions.

As best seen in FIG. 1, the plunger 16 is formed with an enlarged-diameter head or rear end portion 22 and with a rearward, axially extending stem portion 24 which projects therefrom into the hammer H a distance such that it will be impacted by the percussive or impactor element thereof (not shown). Said rear-end portion operates and has sliding bearing in the main bore portion 14 of the housing, and the forward end of the plunger proper similarly has bearing in the smaller-diameter bore portion 20 of the housing member. The plunger 16 is normally maintained in its retracted or rightwise position by means illustratively comprising a spring 28 disposed in encircling relation about the plunger proper and being reactive between the under face of the plunger-end portion 24 and the aforesaid, axially facing internal shoulder 20a at the forward end of the housing member 10.

To prevent angular turning of the plunger 16 within the housing member, it is provided in its outer surface with a keyway 30 with which a pin-type key 32 coacts, said key being shown to project radially-inwardly through the housing wall at the forward end of the housing, which has enlarged external diameter at that end.

The aforesaid plunger 16 also serves as a retainer for a cutting tool generally designated 34 which preferably is of the type having plural transverse cutting edges disposed on a diameter of the tool. More particularly, such a cutting tool comprises a working end and a shank end, said working end in turn comprising a generally cylindrical central or hub part 36, from which extend opposed, substantially coaxially coextensive cutting blades 38a, 38b, whose outer portions 40a, 40b are thinned as compared to their thicker root portions and which have forward, radially extending edges, whose outer portions are formed forwardly concave and ground, thus to provide forwardly facing concave cutting edges 42a, 42b, as best shown in FIG. 2. The shank-end portion of the tool comprises a tapered shank or tang 44 extending rearwardly from its aforesaid working end and adapted to seat in an axially extending, forwardly opening tapered socket 46 provided in the plunger 16. By proper selection of the complemental taper of both its shank and socket surfaces, the cutting tool will be firmly held by friction against any and all normal forces which would tend to separate it from the plunger.

However, provision is made to remove the cutting tool 34 when and if such is desired, such preferably comprising an opening 48 formed in the wall of the housing member and a cross hole 50 formed in the body portion of the plunger 16 at a location along the length thereof which is such that the rearward end of the tapered cutting-tool shank or tang 44 projects a slight distance thereto, said opening and cross hole being so located relatively of one another that they are in registry when the plunger is in its retracted position. Thus, to remove the cutting tool, it is necessary only to insert a punch or drift pin into the aligned opening 48 and hole 50 and thereupon strike same with a hammer or like tool, whereupon the frictional grip of the socket wall on the tapered surface of the cutting tool shank will be broken. Preferably, the opening 48 in the housing is normally closed as by a removable screw 52, it being contemplated that this screw will be removed by unthreading same from the housing preliminary to inserting the punch or drift pin into said holes 48, 50 as aforesaid and replaced after tool interchange has been effected.

According to the invention, the aforementioned shoe member 12, rather than comprising but a single shoe serving whichever one of the cutting blades 38a, 38b the projects therethrough, as is the case with the panel cutter disclosed in my aforesaid application Serial No. 21,663, is instead a double shoe which is adapted to serve as a rest for either of the aforesaid cutting blades 38a, 38b, depending on which way the panel cutter as a whole is turned. More particularly, and as best seen in FIG. 1, a double shoe 12 according to the invention comprises an open-sided V member defined by upper and lower sole plates 12a, 12b disposed in converging relation and terminating forwardly in a rounded point, the opposite ends of the sole plates (and hence the V-shaped shoe member as a whole) being affixed as by welding to generally opposite side portions of the periphery of the housing 10.

To provide for reciprocatory travel of the cutting tool relative to the shoe member 12 as aforesaid, the upper and lower sole plates thereof, which are disposed in planes which are intersected by the path of movement of the blades 38a, 38b, are slotted or kerfed by a common slot 54 which extends across the pointed forward end of the shoe structure and thence rearwardly to approximately the front end of the housing member, through which the cutting blades project, as in FIGS. 1 and 2. This arrangement provides that, when either one of the upper and lower sole plates is disposed substantially flat against a panel or sheet being cut, the cutting blade projecting through said one plate will function as the operative cutting blade, and also that the tool may be turned 180° so as to render the opposite cutting edge oprative through the opposite sole plate.

At the forward or convergent end of the shoe member, the slot 54 is enlarged to define a circular opening 56 of diameter corresponding to that of the hub part 36 of the cutting tool. Accordingly, the tool as a whole, following its disconnection from the plunger socket, may be freely moved through the shoe, and, conversely, a replacement cutting tool to be fitted to the plunger socket may be moved in place through the shoe, consequent to the ability of the tool working end and shank portion to move through the aforesaid circular opening 56 in the forward end of the shoe.

While the operation of a panel cutter as just described will undoubtedly be understood by those skilled in the art, it is briefly summarized as follows: Depending on which way the tool is faced to the workpiece (or the workpiece to the tool), one of the cutting blades 38a, 38b will project through the sole plate which is disposed against the panelwork piece to be cut so as to be in operative cutting position. Usually, the cut to be made in said panel or sheet is started by an suitable means but, once the tool is placed against the sheet or panel with a cutter blade 38a, 38b thereof registered with the starting cut, the operator, after placing his tool in operation, needs only to guide the tool along the predetermined line of cut, since the impact hammer H supplies the actual shearing or cutting force to said blade by way of the plunger 16. Accordingly, a panel cutter of the invention greatly simplifies the operation of making straight-line and/or curved cuts in panels or sheets, with the minimum amount of time and effort on the part of the operator.

It will also be observed that the design of the present powered panel cutter is such that the impact forces supplied to the plunger 16 by the hammer striker or impactor element are transmitted substantially in a straight line to whichever of the cutting blades 38a, 38b is operating on the workpiece, so that the full impact forces generated at the hammer are effectively transmitting to said blade and its cutting edge.

Consequent to the ground cutting edges 42a, 42b being formed outwardly concave, in conjunction with the feature of the one or the other sole plates being positioned directly against the workpiece being cut, the strip of scrap resulting from the cutting operation curls downwardly from the workpiece as generally indicated in FIG. 1, rather than upwardly therefrom as is usual. Thus, the workpiece itself serves to protect the operator of the tool from the scrap being thrown or otherwise moving upwardly in his direction.

While designed particularly for a double-bladed cutting tool as illustrated and described, other types of cutting tools such as punches, cold chisels and the like provided with a tapered shank or tang adapting it to fit the plunger socket 46 and whose tool structure is such as to enable it to reciprocate through the double shoe 12 may be substituted in place thereof. Such adaptation of the present panel cutter to mount cold chisels, punches and like cutting implements is intended to be illustrated in FIG. 5, wherein reference numeral 60 designates a conventional chisel having a tapered shank 44a dimensioned to be and which is frictionally secured in the aforesaid plunger socket 46 and whose structure both as to size and sectional configuration is such as to allow it to move through the shoe slot 54 and its front end opening or hole 56.

Without further analysis, it will be seen that a power-operated panel or sheet-metal cutter according to the invention achieves the objectives therefor as outlined in the foregoing in simple yet highly effective manner. Obviously, since the herein panel cutter operates on a simple principle well known in power-operated reciprocating tools generally, its certain and effective operation is assured. In addition, the panel cutter of the invention offers the further advantage gained by the use of a cutting tool having plural, diametrically opposed blades, that either blade may be employed in making a desired cut, depending on which of the blade cutting edges is in the most effective position to make same. Finally, the invention provides an effective workpiece-engaging shoe structure by which the cutter may be effectively placed against and/or rested on the workpiece during cutting, not only simplifying cutter guidance but also adapting the cutter to be faced to the workpiece from either one of its two opposite sides, depending on which is the more convenient or better suited to the workpiece being cut and/or its position in space with respect to the cutter. In other words, the panel cutter of the invention is equally well adapted to make overhead cuts in a workpiece from below as it is to make cuts when operating from above the workpiece.

As many changes could be made in carrying out the above constructions without departing from the scope of the invention, it is intended that all matter contained in the above description or shown in the accompanying drawing shall be interpreted as illustrative and not in a limiting sense.

I claim:

1. A powered panel cutter adapted for attachment to and operation by a power hammer having an impactor element comprising, in combination, a tubular housing having means at its relatively rearward end for attaching same to said power hammer, a plunger reciprocable in the bore of said housing and being driven on its working stroke by said impactor element, a reciprocable cutting tool coaxial with and having a rear-end shank portion removably affixed to said plunger, said tool having a working end projecting from the plunger through the forward end of said housing, said working end having a forwardly disposed, transverse cutting edge, and a workpiece-engaging shoe means affixed to the forward end of the housing and comprising forwardly converging sole plates disposed in inclined planes which are intersected by the path of reciprocatory movement of the working end of said cutting tool and being correspondingly slotted to allow such tool movement, the construction and arrangement being such that both outer corner portions of said tool working end project through and outwardly from the shoe means.

2. A powered panel cutter according to claim 1, wherein said housing mounts a spring for effecting positive return movement of the plunger and cutting tool affixed thereto to a normal retracted position following each working stroke of the plunger.

3. A powered panel cutter according to claim 2, wherein the shank portion of the cutting tool is formed as a tapered tang, and the forward end of the plunger is provided with a complementally tapered socket in which the tang seats, and said housing and plunger are provided with tool knock-out openings which register when the plunger is in its aforesaid normal retracted position whereby said openings are capable of receiving a knock-out tool.

4. A powered panel cutter according to claim 1, wherein the working end of the cutting tool includes a central hub and said slot is enlarged at the forward end of the shoe means so as to allow passage of the hub therethrough.

5. A powered panel cutter according to claim 1, wherein the converging sole plates of the shoe means merge into one another whereby said sole means has V-configuration in side elevation.

6. A powered panel cutter according to claim 5, wherein the slot extends across the apex portion of the shoe means and is enlarged and configured according to that of the tool at said apex portion as to provide for bodily movement of the cutting tool through the shoe member as required for tool mounting and/or replacement.

7. In a powered panel cutter, a reciprocable punch-type cutting tool comprising a rearwardly tapered shank-end portion and a working end comprising a generally cylindrical hub-like part coaxial with said shank-end portion and a pair of cutting blades substantially axially coextensive with and projecting in radial alignment from said hub, said blades having forward, transversely extending cutting edges.

8. In a powered panel cutter, a reciprocable punch-type cutting tool comprising a rearwardly tapered shank-end portion and a working end comprising a generally cylindrical hub-like part coaxial with said shank-end portion and a pair of cutting blades substantially axially coextensive with and projecting in radial alignment from said hub, said blades terminating forwardly in concave cutting edges.

9. In a powered panel cutter, a reciprocable punch-type cutting tool comprising a rearwardly tapered shank-end portion and a working end comprising a generally cylindrical hub-like part coaxial with said shank-end portion and a pair of cutting blades substantially axially coextensive with and projecting in radial alignment from said hub, said blades having thick root portions and thin outer-end portions, the forward edges of said outer-end portions being concave and ground to a cutting edge.

10. A powered panel cutter adapted for attachment to and operation by a power hammer having an impactor element comprising, in combination, a tubular housing having means at its relatively rearward end for attaching same to said power hammer, a plunger reciprocable in the bore of said housing and being driven on its working stroke by said impactor element, a reciprocable cutting tool coaxial with and having a rear-end shank portion removably affixed to the plunger, said tool having a working end projecting from the plunger through the forward end of said housing, and workpiece-engaging shoe means affixed to the forward end of the housing and comprising forwardly converging sole plates disposed in inclined planes which are intersected by the path of reciprocatory motion of said tool and which merge into and are connected to one another at their forward edges, the sole plates and the apex portion of said shoe means as defined by the forward connected edges of said sole plates being apertured as required for the accommodation and/or movement of a selected one of a plurality of cutting tools therethrough.

References Cited in the file of this patent

UNITED STATES PATENTS

| | | |
|---|---|---|
| 712,843 | Paul | Nov. 4, 1902 |
| 1,267,698 | Roberts et al. | May 28, 1918 |
| 1,418,125 | Carroll | May 30, 1922 |
| 2,172,984 | Moray | Sept. 12, 1939 |
| 2,282,729 | Knauf | May 12, 1942 |
| 2,631,372 | Fournier | Mar. 17, 1953 |
| 2,990,614 | Taggert | July 4, 1961 |
| 3,009,246 | Witherby | Nov. 21, 1961 |

FOREIGN PATENTS

| | | |
|---|---|---|
| 488,796 | Canada | Dec. 16, 1952 |